Jan. 25, 1966   J. KÄGI   3,231,475
NUCLEAR REACTOR PLANT
Filed May 1, 1961   2 Sheets-Sheet 1

Inventor:
JAKOB KÄGI.
By K.B. Mayr
Attorney.

United States Patent Office 3,231,475
Patented Jan. 25, 1966

3,231,475
NUCLEAR REACTOR PLANT
Jakob Kägi, Winterthur, Switzerland, assignor to Sulzer Freres, S.A., Winterthur, Switzerland, a corporation of Switzerland
Filed May 1, 1961, Ser. No. 106,637
Claims priority, application Switzerland, May 17, 1960, 5,667/60
4 Claims. (Cl. 176—60)

The invention relates to a nuclear reactor plant having a heterogeneous reactor whose fuel elements are associated with conduits through which a fluid flows under pressure.

In conventional plants of this type an operating fluid is used which is vaporizable at the pressure and temperature prevailing in the plant, the fluid being vaporized outside of the reactor by means of vapor which has been superheated in the reactor. These plants are inefficient because the superheat temperature must be rather low in order to prevent an adverse effect on the fuel elements and their envelopes or cans.

It is an object of the invention to provide a nuclear reactor plant wherein vapor is used as a coolant for the fuel elements and the thus superheated vapor supplies heat to a heat consumer, the plant affording a considerably higher temperature of the vapor leaving the reactor than conventional plants of this type whereby the thermodynamic efficiency of the plant is considerably increased.

This object is obtained by providing at least two groups of coolant conduits individually associated with the fuel elements of the reactor wherein vapor is superheated by the heat generated by the respective fuel elements. A portion of the vapor leaving a first group of conduits is used for evaporating liquid operating medium and another portion of the vapor leaving the first group of conduits is further superheated in the conduits of the second group.

The novel features which are considered characteristic of the invention are set forth with particularity in the appended claims. The invention itself, however, and additional objects and advantages thereof will best be understood from the following description of embodiments thereof when read in connection with the accompanying drawing wherein:

Corresponding parts are designated by like numerals in all figures.

Figure 1:
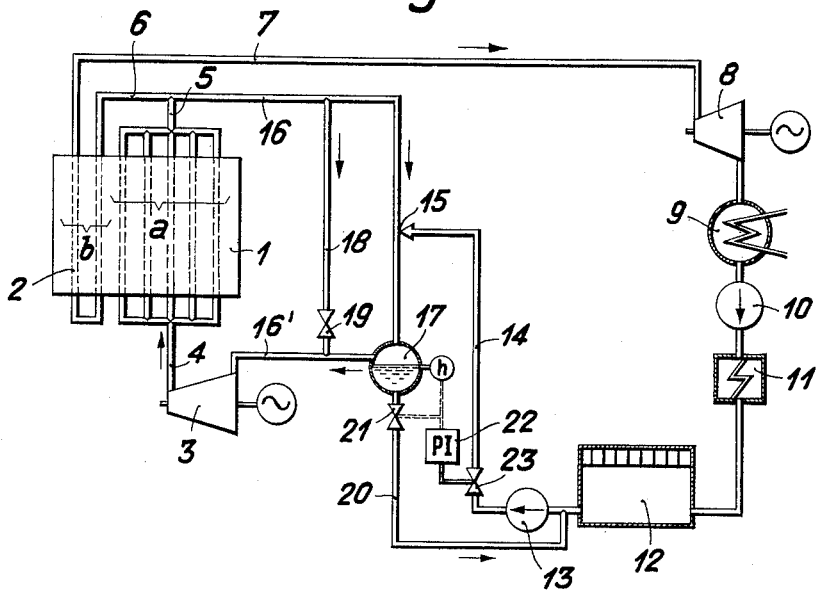
FIG. 1 is a diagrammatic illustration of a plant according to the invention.

Referring more particularly to the drawing, numeral 1 designates a nuclear reactor whose fuel elements, not shown, are provided with coolant conduits 2. There are two groups of these conduits, group $a$ and group $b$. Vapor is forced by a circulating blower 3 through a pipe 4 into the conduits forming the group $a$. The vapor leaving the conduits 2 of the group $a$ is conducted through a pipe 5 partly into a pipe 6 and partly into a pipe 16. The pipe 6 is connected to the inlet of the conduits 2 forming the group $b$ and highly superheated vapor leaving the conduits of the group $b$ is conducted through a pipe 7 to a turbine 8 whose exhaust is condensed in a condenser 9, the condensate being pumped by a condensate pump 10 through a preheater 11 into a condensate tank 12. A feed pump 13 pumps condensate from the tank 12 into a pipe 14.

Part of the vapor superheated in the tube group $a$ and conducted through the pipe 16 enters a separator 17. The vapor separated therein is conducted through pipe 16' to the circulating blower 3. The liquid pumped by the feed pump 13 into the pipe 14 is injected at 15 into the pipe 16 upstream of the separator 17.

A pipe 18 is connected to the pipe 16' upstream of the injection device 15 and downstream of the separator 17 and contains a valve 19 so that a controlled amount of superheated vapor can be by-passed around the injection device 15 and the separator 17.

The liquid space of the separator 17 is connected by a pipe 20 to the conduit connecting the tank 12 and the inlet of the feed pump 13. A valve 21 is interposed in the pipe 20 and controlled by a regulator 22 in response to the liquid level in the separator 17. The valve 21 is opened at increased elevation of the liquid level and conversely. The regulator 22 simultaneously actuates a throttle valve 23 in the pipe 14, opening the valve 23 when closing the valve 21 and vice versa.

A portion of the slightly superheated vapor leaving the tube group $a$ through the pipe 5 is conducted through the pipe 6 to the conduits of the group $b$ and further superheated therein, the highly superheated vapor being conducted to the turbine 8 for producing mechanical work. The exhaust of the turbine 8 is condensed and conducted to the tank 12 as described above. The balance of the slightly superheated vapor leaving the tube group $a$ is conducted through the pipe 16 to the injection device 15 where the vapor is mixed with liquid operating medium supplied by the feed pump 13. The saturated vapor produced thereby may be superheated by superheated vapor supplied through the pipe 18. Thereupon the vapor is conducted by means of the circulating blower 3 to the conduits of the group $a$ for further superheating. The part of the liquid operating medium which is not evaporated by the admixture of superheated vapor in the device 15 and separated in the separator 17 is returned to the feed pump 13 through the pipe 20. As described before, discharge of liquid operating medium from the separator 17 is controlled by the valve 21 which is actuated by the regulator 22 in response to the elevation of the liquid level in the separator. The regulator 22 also controls the valve 23 as described supra.

In the plant illustrated in FIG. 1 vapor is superheated in two consecutive stages. The temperature of the vapor leaving the first stage which is formed by the conduits of the group $a$ is relatively low. The vapor leaving the second superheating stage which is formed by the conduits of the group $b$ has the maximum temperature to which the reactor can be subjected. Therefore, there is a great temperature drop between the fuel elements associated with the conduits of the group $a$ and the coolant so that heat transfer from the fuel elements to the coolant is relatively great. The conduits of the group $a$ are preferably located in the center of the reactor where more heat is generated than in the peripheral parts of the reactor. The fuel elements associated with the conduits of the group $a$ are intensively cooled and can, therefore, be provided with canning made, for example, of aluminum or magnesium which is relatively sensitive to heat but offers little resistance to the neutron flow. The conduits forming the group $b$ wherein a part of the operating vapor is superheated to the maximum temperature in the plant are preferably located in the peripheral zone of the reactor where heat generation is relatively small and relatively high temperatures can be permitted. Because of this relatively small heat generation a smaller temperature drop between the fuel elements and the coolant effects enough heat flow to prevent undesired superheating of the fuel elements. Since the number of fuel elements in the group $b$ is relatively small these elements may be provided with canning made of relatively high heat-resistant material, for example of austenitic steel or zirconium. These materials are not favorable with respect to the neutron economy of the reactor; the increase of the thermodynamic efficiency due to the increased final superheat temperature, however, justifies the sacrifice in neutron economy. If desired, the fuel elements associated with the conduits of the group $b$ may be made of enriched fissionable material.

In the plant according to the invention, the heat removal is intensive in the parts of the reactor where relatively much heat is generated. At the same time the maximum temperature of the vapor in the plant is considerably increased without excessive decrease of the neutron economy.

Figure 2:
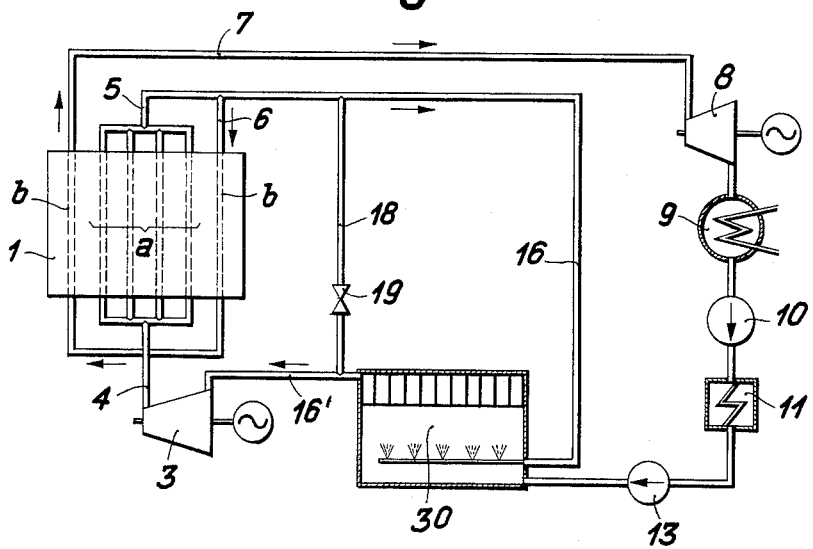
FIG. 2 is a diagrammatic illustration of a modified plant according to the invention.

In the modification of the plant shown in FIG. 2 an evaporator 30 is interposed between the pipe lines 16 and 16'. Liquid operating medium is pumped into the evaporator by the feed pump 13 and is evaporated by vapor supplied through the pipe 16. The thus produced saturated vapor may be superheated by vapor from the pipe 18 before entering the circulating blower 3.

Figure 3:
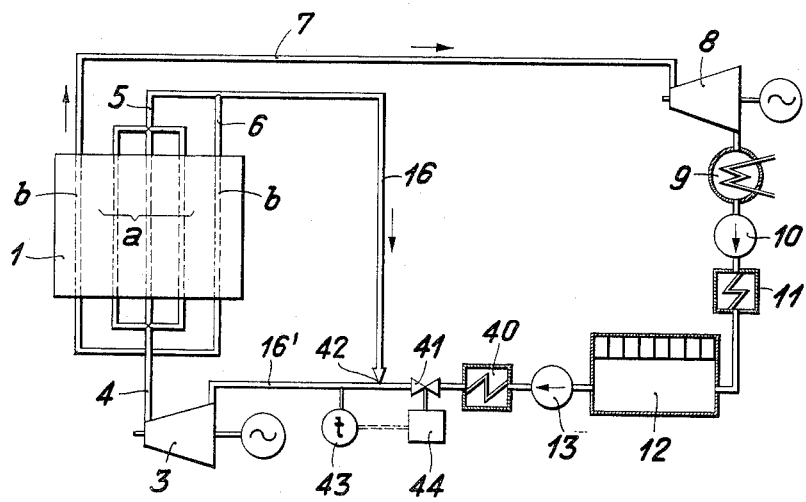
FIG. 3 is a diagrammatic illustration of a further modification of a plant according to the invention.

In the modification shown in FIG. 3 liquid operating medium is pumped by the feed pump 13 through a preheater 40 and a throttle valve 41 to an injection device 42 where the liquid operating medium is mixed with vapor from the pipe 16. Downstream of the injection device 42 a temperature sensitive device 43 is arranged which produces signals controlling a regulator 44 which actuates the valve 41. The valve 41 is opened upon undesired increase of the temperature measured at 43 and is closed upon undesired decrease of the temperature at the device 43. In this way, slightly superheated vapor is supplied to the conduit group $a$ of the reactor by means of the pump 3.

Water and steam may be used as operating medium, the steam acting as coolant of the reactor and producing mechanical work in a turbine. The coolant passing through the reactor may transfer the heat absorbed from the reactor in the conventional manner to a different operating medium which supplies heat consumers. The conduits forming the groups $a$ and $b$ include all parts and conduits which conduct the operating medium within the reactor. These conduits are normally subjected to internal pressure by the operating medium. The invention, however, also includes arrangements where there is no superpressure of the operating medium in these conduits. The fuel elements may be placed within the coolant conduits; however, the present invention is not limited to this structure and also includes arrangements where the coolant-conducting conduits are inside the fuel elements.

I claim:

1. A nuclear reactor plant comprising a heterogeneous reactor, means for evaporating a liquid operating medium, outside of the reactor, at least two groups of cooling conduits in said reactor, first conduit means for supplying vapor from said evaporating means to a first of said groups of cooling conduits for superheating the vapor in said first group of cooling conduits, a pipe directly connecting said first group of cooling conduits to a second of said groups of cooling conduits for directly conducting superheated vapor as discharged from said first group of cooling conduits into said second group of cooling conduits for additionally superheating the superheated vapor in said second group of cooling conduits, a heat consumer connected to said second group of cooling conduits to receive highly superheated vapor therefrom, and second conduit means connected to said first group of cooling conduits and to said means for evaporating a liquid operating medium for conducting vapor superheated in said first group of cooling conduits to said evaporating means for evaporating the liquid operating medium.

2. A nuclear reactor plant comprising a heterogeneous reactor, at least two groups of coolant conduits in said reactor, first conduit means for supplying vapor to a first of said groups of conduits for superheating the vapor in said first group of conduits, a pipe directly connecting said first group of conduits to a second of said groups of conduits for conducting vapor as discharged from said first group of conduits to said second group of conduits for additionally superheating the vapor in said second group of conduits, a heat consumer connected to said second group of conduits to receive highly superheated vapor therefrom, second conduit means connected to said first group of conduits for receiving superheated vapor therefrom, injection means connected to said second conduit means for injecting liquid operating medium thereinto to be evaporated by the superheated vapor, and a liquid separator connected to said last mentioned conduit means downstream of said injection means, said first conduit means being connected to the vapor space of said separator to receive vapor therefrom.

3. A nuclear reactor plant comprising a heterogeneous reactor, at least two groups of coolant conduits in said reactor, first conduit means for supplying vapor to a first of said groups of conduits for superheating the vapor in said first group of conduits, a pipe directly connecting said first group of conduits to a second of said groups of conduits for conducting vapor as discharged from said first group of conduits to said second group of conduits for additionally superheating the vapor in said second group of conduits, a heat consumer connected to said second group of conduits to receive highly superheated vapor therefrom, second conduit means connected to said first group of conduits for receiving superheated vapor therefrom, a supply conduit for liquid operating medium connected to said second conduit means for mixing the vapor conducted by said second conduit means with liquid operating medium for evaporation thereof, the connection of said supply conduit and said second conduit means being connected to said first conduit means, a valve in said supply conduit for liquid operating medium, and temperature responsive means connected to said first conduit means and to said valve for opening the latter upon increase of the temperature of the vapor flowing through said first conduit means to the first group of conduits above a predetermined value and conversely.

4. A nuclear reactor plant comprising:
a heterogeneous reactor having a central zone and a peripheral zone,
means for evaporating a liquid operating medium outside of the reactor,
a first group of cooling conduits in said central zone of said reactor,
first conduit means for supplying vapor from said evaporating means to said first group of cooling conduits for superheating the vapor in said first group of cooling conduits,
a second group of cooling conduits in said peripheral zone of said reactor,
a pipe directly connecting said first group of cooling conduits to said second group of cooling conduits for directly conducting superheated vapor as discharged from said first group of cooling conduits to said second group of cooling conduits for additionally superheating the vapor in said second group of cooling conduits,
a heat consumer connected to said second group of cooling conduits to receive highly superheated vapor therefrom,
and second conduit means connected to said first group of cooling conduits and to said means for evaporating a liquid operating medium for conducting vapor superheated in said first group of cooling conduits to said evaporating means for evaporating the liquid operating medium.

References Cited by the Examiner

UNITED STATES PATENTS

| | | | |
|---|---|---|---|
| 2,999,059 | 9/1961 | Treshow | 176—42 |
| 3,085,964 | 4/1963 | Ritz et al. | 176—61 |
| 3,091,582 | 5/1963 | Bradley | 176—60 |
| 3,108,938 | 10/1963 | Nettel et al. | 176—59 |

FOREIGN PATENTS

| | | |
|---|---|---|
| 563,693 | 1/1958 | Belgium. |
| 584,390 | 3/1960 | Belgium. |
| 1,240,821 | 8/1960 | France. |
| 880,697 | 10/1961 | Great Britain. |

OTHER REFERENCES

MacNaughton: Elementary Steam Power Engineering, 3rd edition, 1948, pages 130, 131, 589 and 590.

REUBEN EPSTEIN, *Primary Examiner.*

CARL D. QUARFORTH, *Examiner.*